Patented Feb. 25, 1941

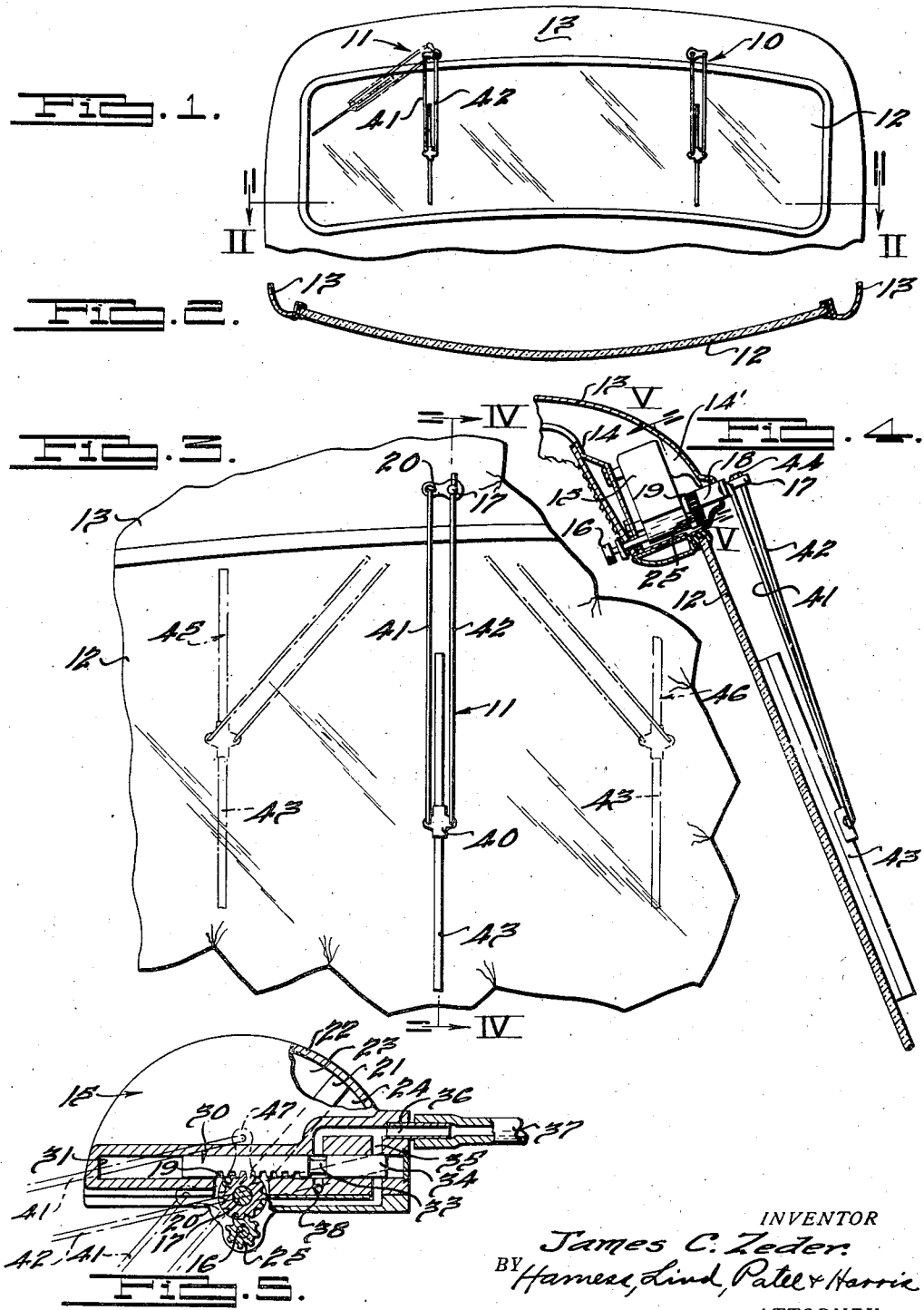

2,232,757

UNITED STATES PATENT OFFICE 2,232,757

WINDSHIELD CLEANER

James C. Zeder, Detroit, Mich., assignor to Chrysler Corporation, Highland Park, Mich., a corporation of Delaware Application November 30, 1938, Serial No. 243,147

5 Claims. (Cl. 15—253)

This invention relates to improved window cleaners and particularly to cleaners for cleaning curved windshields of vehicles.

The main object of the invention is to provide an improved windshield cleaner, the wiper element of which is always maintained substantially parallel to its central position while in normal operation so as to maintain uniform working pressure throughout its contacting surface portion.

Another object of the invention is to provide a cleaner for vehicle windshields which will operate on straight or curved windshields with equal efficiency and which does not involve the use of complicated mechanism.

A further object of the invention is to provide a cleaner of this character which has parking mechanism whereby the wiper element can be conveniently parked out of the line of vision of the driver or of the passengers in the vehicle; to provide a parking mechanism which is responsive to movement of the remote control member for controlling the normal operation of the cleaner motor; and to provide a cleaner of this kind which is inexpensive and efficient and which will not easily get out of order.

Other objects and advantages of the invention will be apparent from the following description taken in connection with the accompanying drawing, in which:

Fig. 1 is a fragmentary front elevational view of a vehicle body having mounted thereon cleaners embodying the invention.

Fig. 2 is a horizontal sectional view taken as indicated by the line 2—2 of Fig. 2.

Fig. 3 is an enlarged fragmentary front elevational view of the windshield and one of the windshield wipers shown in Fig. 1.

Fig. 4 is an enlarged vertical sectional view taken approximately as indicated by the line 4—4 of Fig. 3.

Fig. 5 is an enlarged sectional view taken on the line 5—5 of Fig. 4 through the control mechanism a portion of the engine casing being broken away to show certain details thereof.

In the form of the invention illustrated in the drawing, the improved winshield cleaners 10 and 11 are substantially identical, therefore it is thought that a description of one will be adequate to explain the operation. The cleaners 10 and 11 are illustrated as operating on the curved windshield 12 of a vehicle body 13. The windshield 12 (a section of which is shown in Fig. 2) has a vertical axis of curvature but it is to be understood that the improved cleaner will operate satisfactorily on other types of windshields, such as those having a straight surface or a surface having a horizontal axis of curvature. The vehicle body includes a header member 14 which is spaced from the outer shell of the top portion of the vehicle body to form a space 14' (see Fig. 4).

The improved windshield cleaner comprises a vacuum operated motor 15 which is substantially enclosed within the space 14' and which has a rearwardly extending remote control member 16 and a forwardly protruding shaft 17 on which is rotatably mounted a sleeve 18. The sleeve 18 (see Fig. 4) has a pinion portion 19 and a normally horizontally extending arm 20, both formed integrally therewith. The motor 15 has an oscillating piston 21 mounted in a casing 22 which is responsive to suction on either side thereof, as indicated at 23 and 24 in Fig. 5. The forward end of the control member 16 has a gear 25 non-rotatably secured thereto in engagement with the pinion 19.

The casing 22 has formed therein a passageway 31 which extends transversely of the axis of the shaft 17. Within the passageway 31 is a longitudinally slidable valve member 30 having rack teeth 32 on its lower side. The end portion 34 of the member 30 is adapted to control the vacuum through a passage 35 which communicates with a main passage 36 which in turn is connected with a vacuum line 37 supplied with vacuum from a suitable source such as the manifold of the vehicle engine (not shown). The passage 35 is open during normal operation of the motor 15 and the vacuum therein acts through the usual valve mechanism (not shown) of the motor to oscillate the piston 21 in an arc less than the maximum arc in a manner well-known to those expert in the art. The member 30 has a reduced portion 33 so located that, when the end portion 34 closes the passage 35, the reduced portion 33 opens a passage 38 which communicates directly between the main passage 36 and the interior of the motor 22, as indicated in Fig. 5, without going through the oscillating valve mechanism of the motor. When vacuum is admitted to the passage 38, as illustrated in Fig. 5, the vacuum acts within the chamber portion 24 to pull the piston in a clockwise direction, as viewed in Fig. 5, beyond its normal travel to a parked position out of the line of vision of the persons in the car as will presently be more apparent.

The arm 20 is stationary during the normal operation of the cleaner and forms the upper short link of a linkage which, together with a lower short link 40 and side links 41 and 42 respectively, forms a parallelogram. The short link 40 has fixed thereto a vertically extending wiper blade member 43. Link 42 is of spring steel and is fixed at 44 to the forward end of the shaft 17 in such manner that the wiper blade 43 is urged against the windshield panel. Movement of the shaft 17 is transmitted through said link to oscillate the blade member 43. The upper short link 20, by reason of its being integral with the sleeve 18 and gear 19, remains in its central horizontal position during normal operation of the wiper blade 43.

To place the cleaner in operation, the vehicle operator rotates the control member 16 in a clockwise direction (as viewed from the interior of the vehicle). This movement of the control member, through the intermediary of the gears 25 and 19 and the rack teeth 32, causes the valve member 30 to uncover the passage 35 admitting suction to the conventional reciprocating valve mechanism of the motor thereby causing the blade member 43 to be oscillated between its extreme positions which are indicated at 45 and 46 in Fig. 3. Because of the parallelogram links 20, 40, 41 and 42, the link 20 of which is held stationary, the blade member 43 will be maintained in a position parallel to its normal central position during the normal oscillating movement just described.

When the control member 16 is rotated in a counterclockwise direction (as viewed from the interior of the vehicle), the end portion 34 of the member 30 closes the passage 35 and the passage 38 is opened to line 36 as shown in Fig. 5. At the same time, because of the rotation of gear 19, the upper link 20 is revolved to its parked position indicated at 47 in Fig. 5.

This movement of the link 20 causes a corresponding movement of the link 40, which forms the opposite side of the parallelogram, and results in movement of the wiper blade 43 to a position of parallelism with links 41 and 42.

The parts are now in their parked positions (as shown by the dotted lines on the left of Fig. 1) where they are held partly by friction and partly because suction is present in the chamber 24 on one side of the piston at all times when the vehicle motor is operated.

When it is desired to place the windshield cleaner in operation, it is necessary only for the operator to turn the control member 16 in a clockwise direction whereby upper link 20 is moved to its illustrated horizontal position, the passage 38 is covered, and the passage 35 uncovered to cause the cleaner to operate in the normal manner.

By maintaining the blade member 43 parallel with its normal central position during operation, the blade member may be made straight and yet satisfactorily clean a windshield having a vertical axis of curvature. It is obvious that the cleaner may be mounted at the side of the windshield to operate upon a windshield having a horizontal axis of curvature.

The wiper operates with uniform force throughout its entire path of operation on the windshield and is parked automatically in response to movement of the control member of the cleaner. The cleaner is inexpensive and efficient and, inasmuch as its windshield-contacting portions exert substantially the same force, uniform wear and even operation of the cleaner blade and associated linkage is effected.

Although but one specific embodiment of the invention is herein shown and described, it will be understood that various changes in the size, shape and arrangement of parts may be made without departing from the spirit of the invention.

What I claim is:

1. In a windshield cleaner having a motor and an arm member, said arm member adapted to be oscillated by said motor through a normal arc of operation and to a parked position beyond said normal arc, a wiper member attached to one end of said arm member, means for maintaining said wiper member parallel to its normal central position during said oscillation through said normal arc and for moving it into parallelism with said arm member when the latter is in its parked position, valve means for controlling the operation of said motor, a manually operable valve control member and means associated with said valve control member for moving said wiper member into parallelism with said arm member when said control member is operated to stop said motor.

2. A windshield cleaner comprising a motor, a shaft adapted to be oscillated by said motor through a normal arc of operation, a wiper blade, a parallelogram linkage connecting said shaft and said wiper blade, one of the links of said parallelogram being normally stationary with respect to said shaft whereby said blade is maintained parallel to a predetermined normal position throughout said oscillation and means for oscillating said stationary link about the axis of said shaft thereby to move said blade out of parallelism with said predetermined position.

3. A windshield cleaner for a motor vehicle comprising a wiper blade member, a motor having a forwardly extending shaft and including means for defining a normal stroke to said blade member, a sleeve rotatably mounted on said shaft and having a pinion portion, a rearwardly extending control member drivingly connected with said pinion portion, a parallelogram shape linkage having an upper short link fixed to said sleeve in stationary and horizontal position during normal operation of said blade member and a lower short link fixed to said blade member, a relatively long side link connected at one end to said shaft and at its other end to said lower short link, a valve member for controlling said motor, said valve member having a rack portion engageable with said pinion portion, whereby movement of said valve member to stop the normal operation of said motor, moves said blade member beyond its normal stroke and revolves said sleeve and upper short link about the axis of said shaft to thus park said wiper blade member out of view-obstructing position.

4. In a windshield cleaner having a motor and an arm member, said arm member adapted to be oscillated by said motor through a normal arc of operation and to a parked position beyond said normal arc, a wiper member attached to one end of said arm member, means for maintaining said wiper member parallel to its normal central position during said oscillation through said normal arc, valve means for controlling the operation of said motor, one position of said valve causing said motor to oscillate said arm through said normal arc and another position of said valve causing said motor to move said arm to said parked position, a manually operable valve control member and means associated with said control member for manually moving said wiper member into parallelism with said arm member when said control member is operated to park said arm member.

5. A windshield cleaner for a motor vehicle comprising a wiper blade, a motor having an outwardly extending shaft and including means for defining a normal stroke to said blade, a sleeve journalling said shaft, a parallelogram linkage having an upper short link fixed to said sleeve in stationary and horizontal position during normal operation of said blade and a lower short link fixed to said blade, a relatively long side link connected at one end to said shaft and at its other end to said lower short link whereby said blade is maintained parallel to a predetermined normal position throughout its stroke and means for revolving said upper short link about the axis of said shaft to move said blade to a non-parallel position.

JAMES C. ZEDER.